(12) United States Patent
Takayama et al.

(10) Patent No.: US 6,862,882 B2
(45) Date of Patent: Mar. 8, 2005

(54) PNEUMATIC BOOSTER

(75) Inventors: Toshio Takayama, Yamanashi-ken (JP); Takuya Obata, Yamanashi-ken (JP)

(73) Assignee: Tokico Ltd., Kawasaki (JP)

( * ) Notice: Subject to any disclaimer, the term of this patent is extended or adjusted under 35 U.S.C. 154(b) by 34 days.

(21) Appl. No.: 10/641,079

(22) Filed: Aug. 15, 2003

(65) Prior Publication Data

US 2004/0060431 A1 Apr. 1, 2004

(30) Foreign Application Priority Data

Sep. 30, 2002 (JP) ........................................ 2002-286291

(51) Int. Cl.[7] ............................................. F16D 31/02
(52) U.S. Cl. ........................... 60/397; 60/411; 91/376 R
(58) Field of Search .......................... 60/397, 411, 412; 91/376 R

(56) References Cited

U.S. PATENT DOCUMENTS

| | | | | |
|---|---|---|---|---|
| 3,754,841 A | * | 8/1973 | Grabb et al. ................. | 417/189 |
| 3,824,792 A | * | 7/1974 | Grabb et al. ................... | 60/411 |
| 4,554,786 A | * | 11/1985 | Takeuchi et al. .............. | 60/397 |
| 6,625,981 B2 | * | 9/2003 | Ikeda et al. ................... | 60/397 |
| 6,796,772 B2 | * | 9/2004 | Ikeda et al. ................. | 417/196 |

* cited by examiner

Primary Examiner—F. Daniel Lopez
Assistant Examiner—Michael Leslie
(74) Attorney, Agent, or Firm—Wenderoth, Lind & Ponack, L.L.P.

(57) ABSTRACT

There is provided a pneumatic booster having an ejector, which achieves space-saving and enables easy piping.

An ejector 4 is provided within a constant-pressure chamber 3 formed in an outer shell 2. A connecting pipe 19 communicated with an outlet of a diffuser and a connecting pipe communicated with an inlet of a nozzle extend outward of the shell, and a suction port is open to the inside of the constant-pressure chamber 3 through a check valve. The connecting pipe 19 is communicated with the constant-pressure chamber 3 through a check valve 10, and is connected to a suction pipe of an engine (a source of a negative pressure). The connecting pipe on the inlet side of the nozzle is connected to an air cleaner (the atmosphere). A negative pressure is directly supplied from the connecting pipe 19 to the constant-pressure chamber 3 through the check valve 10. The ejector 4 is operated to supply a high degree of vacuum to the constant-pressure chamber 3 through the suction port. The ejector 4 is provided within the constant-pressure chamber 3 so as to achieve space-saving. The check valve 10 is provided in the ejector 4 and the connecting pipe 19 is extended outward of the shell, so as to enable easy piping.

7 Claims, 4 Drawing Sheets

PNEUMATIC BOOSTER

BACKGROUND OF THE INVENTION

The present invention relates to a pneumatic booster mounted on a brake apparatus for a vehicle, such as an automobile.

Generally, in a brake apparatus for an automobile, a pneumatic booster is provided to enable a large braking force to be generated. In the booster, a suction pressure of an engine is utilized as a negative pressure by being introduced into a constant-pressure chamber (a negative-pressure chamber) of the booster; and a thrust force is generated in a power piston due to a difference between the negative pressure in the negative-pressure chamber and an atmospheric pressure, thus enhancing a brake operating force.

Further, there is known a technique of using an ejector to supply a high degree of vacuum to a pneumatic booster. The ejector comprises a nozzle, a diffuser disposed downstream of the nozzle and a suction port (a vacuum pick-up port) provided between the nozzle and the diffuser. By flowing a gas through the nozzle towards the diffuser, a high-speed jet flow is generated, to thereby create a high degree of vacuum at the suction port.

Use of an ejector is especially advantageous where a supercharger, such as a turbocharger, is utilized as it enables a high power to be obtained from a small engine. When a supercharger is used, suction air is pressurized by the supercharger, which results in a lowering of the degree of a vacuum in a suction pipe of the engine. In such a case, an ejector is an effective means for increasing the degree of vacuum to be introduced to a pneumatic booster.

In conventional techniques, for example, as is indicated in Examined Japanese Patent Application Publication No. S63-39469, an ejector is provided as a separate body between a suction pipe of an engine and a pneumatic booster. Alternatively, as is indicated in Japanese Patent Application Public Disclosure No. 2002-211385, an ejector may be attached to the exterior of a pneumatic booster.

SUMMARY OF THE INVENTION

However, in the above-mentioned conventional techniques, the following problems arise. That is, since the ejector is provided exterior to the pneumatic booster, it is necessary to provide a space in an engine compartment for mounting the ejector, which imposes limitations on the layout of the compartment. Further, during transportation, a pneumatic booster and an ejector must be separately packaged, which incurs extra expense. Further, it is necessary to provide piping between the ejector and each of an engine suction pipe, an air cleaner (or a downstream-side portion of a turbocharger) and a pneumatic booster. Therefore, an operation for mounting the ejector is made difficult.

In view of these problems and drawbacks, the present invention has been made. It is an object of the present invention to provide a pneumatic booster combined with an ejector, which achieves space-saving, and which is easy to transport, and assemble.

The present invention provides a pneumatic booster comprising:

a shell;

a power piston dividing the inside of the shell into a constant-pressure chamber and a variable-pressure chamber, with a negative pressure being supplied to the constant-pressure chamber, wherein a pressure in the variable-pressure chamber is adjusted, to thereby generate a thrust force in the power piston under a differential pressure generated between the constant-pressure chamber and the variable-pressure chamber; and an ejector provided within the constant-pressure chamber, the ejector comprising:

an inlet pipe communicated with an air inlet on a side of a nozzle of the ejector; and an outlet pipe communicated with an air outlet on a side of a diffuser of the ejector, the inlet pipe and the outlet pipe extending to the outside of the shell, a suction port of the ejector being open to the inside of the constant-pressure chamber.

By this arrangement, the ejector is operated by flowing air from the inlet pipe to the outlet pipe, to thereby create a negative pressure at the suction port for supply to the constant-pressure chamber.

It is preferred that the ejector further comprise a first check valve which allows only a flow of air from the constant-pressure chamber towards the suction port and a second check valve which enables communication between the outlet pipe and the constant-pressure chamber, and allows only a flow of air from the constant-pressure chamber towards the outlet pipe.

By this arrangement, when a degree of vacuum supplied to the outlet pipe is higher than that in the constant-pressure chamber, the second check valve opens, and a negative pressure is directly supplied from the outlet pipe to the constant-pressure chamber. When a degree of vacuum supplied to the outlet pipe is lower than that in the constant-pressure chamber, air flows from the inlet pipe to the outlet pipe, and a negative pressure generated at the suction port by the operation of the ejector is supplied to the constant-pressure chamber. A reverse flow of air from the constant-pressure chamber to the suction port is prevented by the first check valve.

Preferably, the shell is generally in the form of a bottomed cylinder, and a mounting recess for mounting of a master cylinder is formed at a bottom portion of the shell. It is also preferable for the ejector to be bent in a circumferential direction of the shell, and to be provided along an outer circumferential surface of the mounting recess at the bottom portion of the shell.

By this arrangement, a space within the constant-pressure chamber can be effectively utilized.

The ejector may comprise a plurality of ejector bodies arranged in parallel.

By this arrangement, it is possible to obtain a sufficiently large volume of suction air. Even when a suction pressure of an engine is low, the degree of vacuum in the negative-pressure chamber can be rapidly recovered, thus increasing responsiveness of the pneumatic booster.

DETAILED DESCRIPTION OF THE INVENTION

An embodiment of the present invention will now be described in detail with reference to the accompanying drawings.

Figure 1:
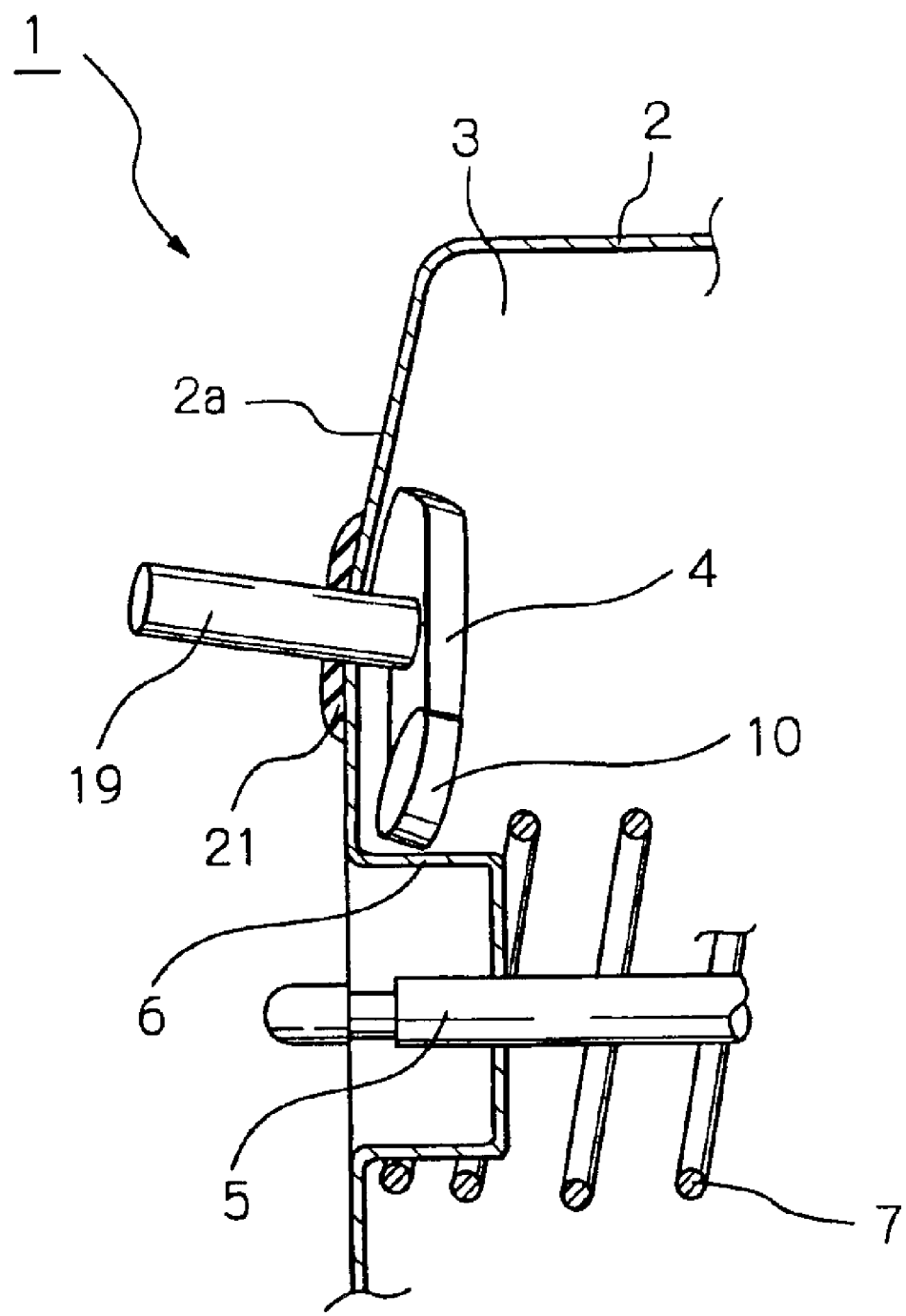
FIG. 1 is a vertical cross-sectional view showing a general arrangement of an essential part of a pneumatic booster according to an embodiment of the present invention.
Figure 2:
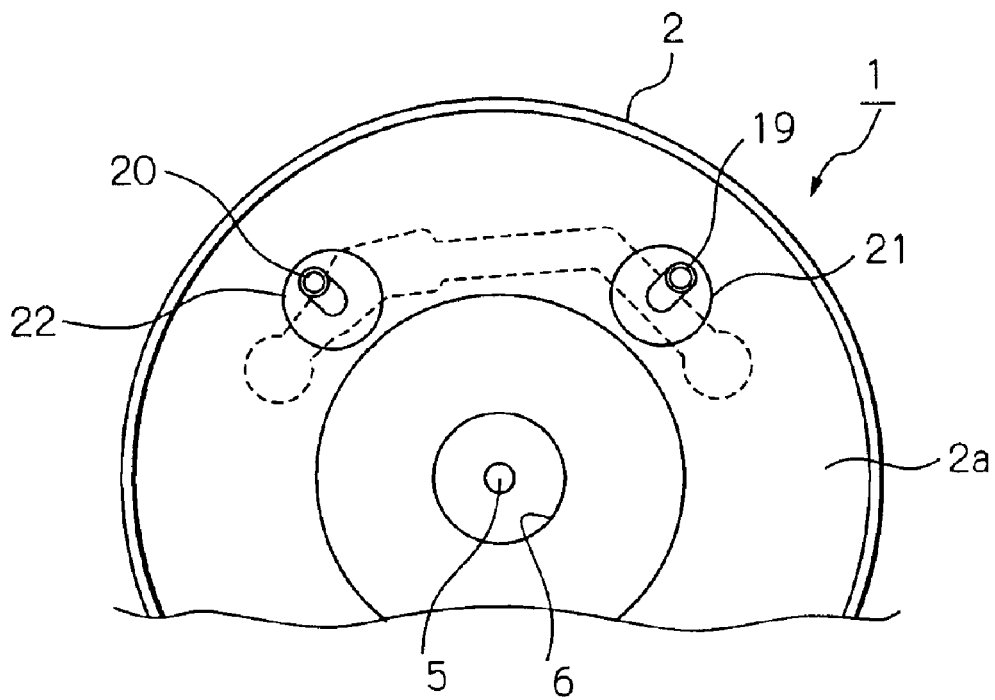
FIG. 2 is a front view of the pneumatic booster shown in FIG. 1.
Figure 3:
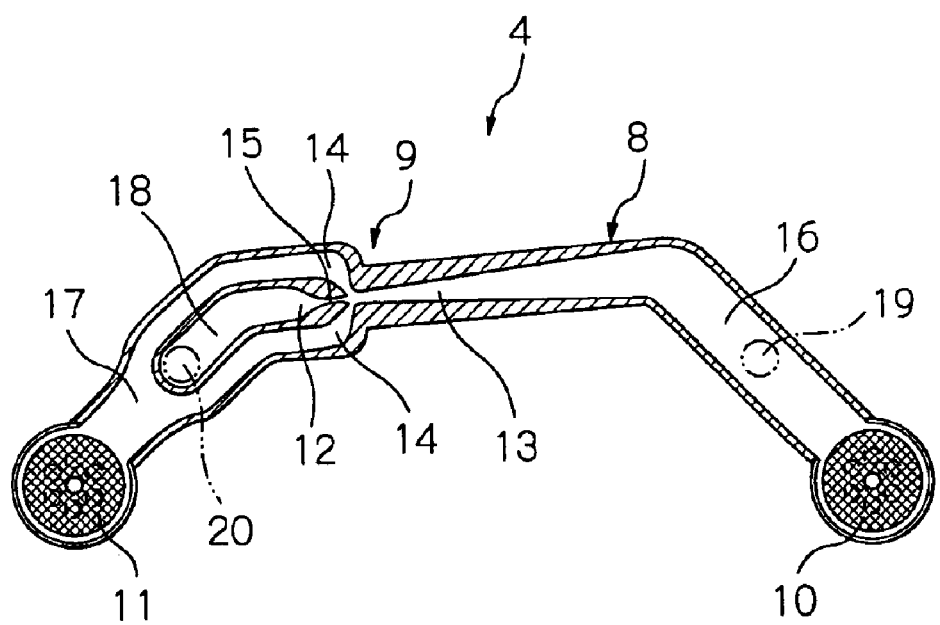
FIG. 3 is a transverse cross-sectional view of an ejector accommodated within the pneumatic booster shown in FIG. 1.
Figure 4:
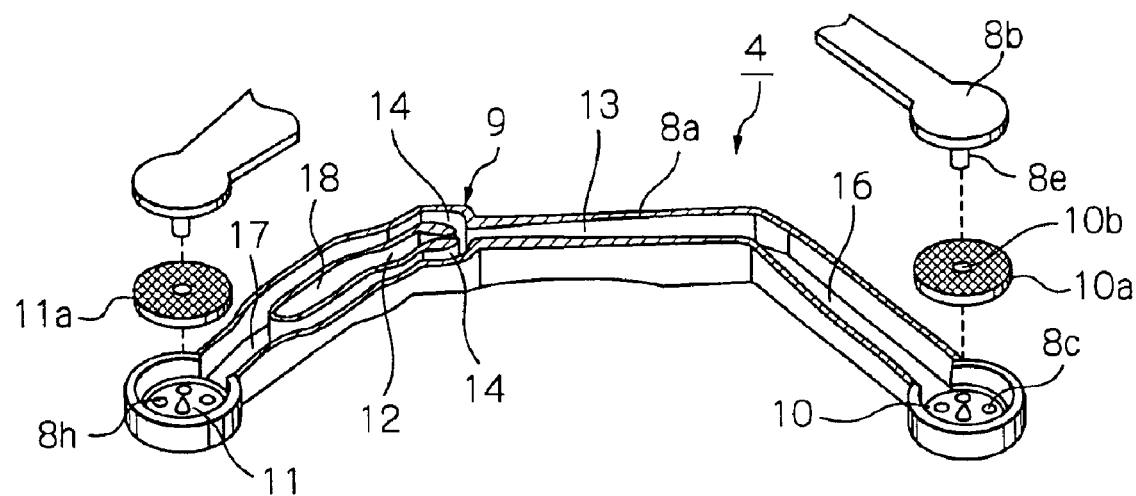
FIG. 4 is a perspective view, in transverse section, of the ejector shown in FIG. 3.
Figure 5:
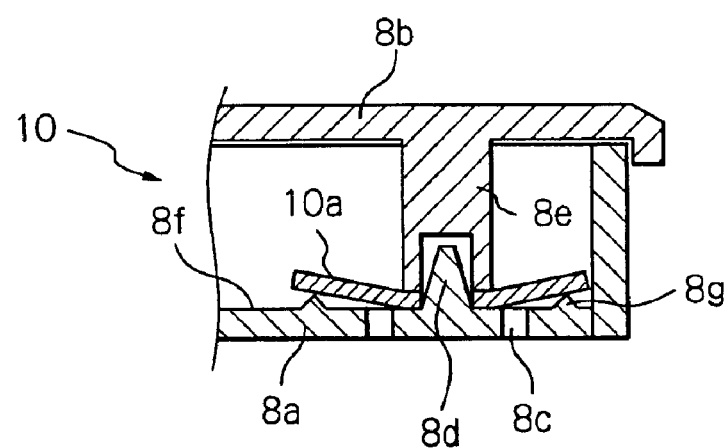
FIG. 5 is a vertical cross-sectional view of a check valve.
Figure 6:
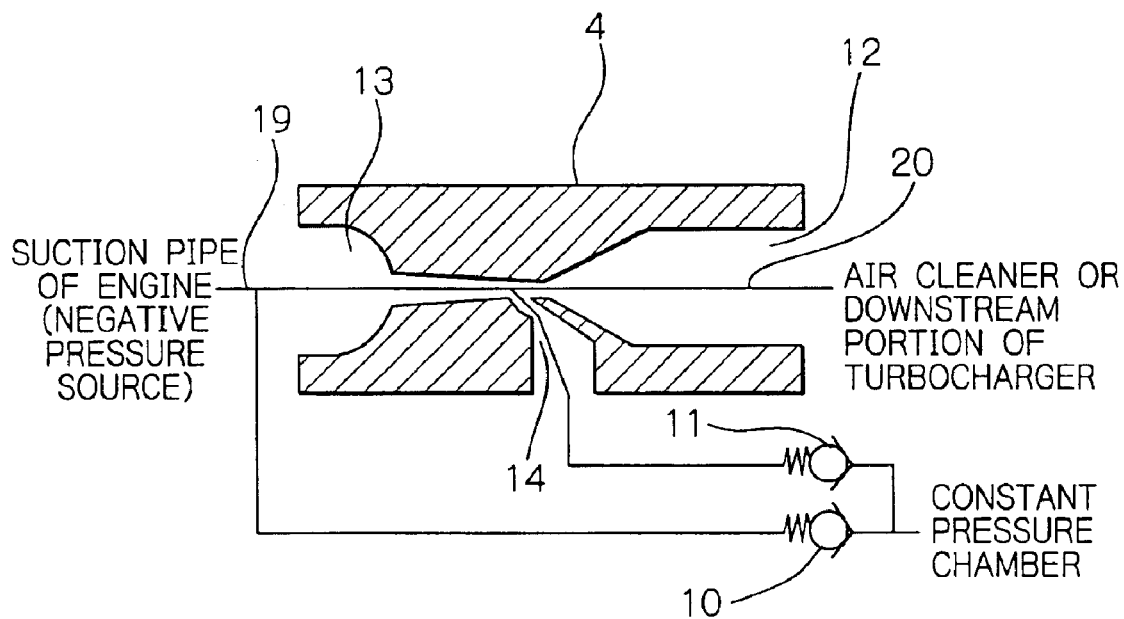
FIG. 6 is a circuit diagram of air pressure of the ejector shown in FIG. 3.

Referring to FIGS. 1 and 2, a pneumatic booster 1 in this embodiment comprises an outer shell 2 generally in the form of a bottomed cylinder and a power piston (not shown) which divides the inside of the outer shell 2 into a constant-pressure chamber 3 (a negative-pressure chamber) and a variable-pressure chamber (not shown). A negative pressure is always supplied to the constant-pressure chamber 3 through a suction pipe (or intake pipe) of an engine (not shown) and an ejector 4, which are described later. Atmospheric air is introduced into the variable-pressure chamber when a force is applied through a brake pedal to an input rod (not shown). By operating the brake pedal, a differential pressure is generated between the constant-pressure chamber and the variable-pressure chamber, to thereby generate a thrust force in the power piston, thus applying a servo power to an output rod 5. As shown in FIG. 2, the outer shell 2 has a circular bottom portion 2a. A mounting recess 6 on which a master cylinder of a brake apparatus (not shown) is mounted is formed at a central portion of the bottom portion 2a of the outer shell 2. The output rod 5 for pressing a plunger of the master cylinder extends into the mounting recess 6. In FIG. 1, reference numeral 7 denotes a return spring for the power piston.

The ejector 4 is provided within the constant-pressure chamber 3 formed by the outer shell 2. As shown in FIGS. 3 to 6, the ejector 4 comprises a case 8 having a generally rectangular cross-section. The rectangular case 8 comprises a lower portion 8a including a recess extending in a longitudinal direction of the case 8, and an upper portion 8b extending in the longitudinal direction so as to cover an upper open end of the recess. Passages 16 and 17, which are described later, form a part of the recess. The rectangular case 8 comprises a generally straight portion and two bent portions extending at obtuse angles from opposite ends of the straight portion. Thus, the case 8 is formed so as to extend in a circumferential direction of the bottom portion 2a of the outer shell 2. The ejector 4 also comprises an ejector body 9 and two check valves, namely, a check valve 10 (a second check valve) and a check valve 11 (a first check valve). The ejector body 9 and the two check valves 10 and 11 are provided within the rectangular case 8. The ejector body 9 and the two check valves 10 and 11 are formed integrally with the case 8.

The ejector body 9 forms the generally straight portion of the case 8 between the two bent portions, and comprises an upstream-side nozzle 12, a downstream-side diffuser 13 and two suction ports 14. The two suction ports 14 are open to opposite sides between the nozzle 12 and the diffuser 13. The nozzle 12 and the diffuser 13 provide a single Laval nozzle having a continuously reduced inlet port and a gradually expanded outlet port having a spread angle of about 5 to 10°. Each suction port 14 extends downstream from a throat portion 15 of the nozzle 12 by a distance corresponding to about 2 to 3 times the width of the throat portion 15.

The check valve 10 is provided at one end of the case 8, and communicates with an outlet of the diffuser 13 of the ejector body 9 through the passage 16 formed in the case 8. The check valve 10 comprises a plurality of through-holes 8c formed at the bottom of the lower portion 8a and a valve body 10a capable of sealing the through-holes 8c. The valve body 10a is in a circular form conforming to the form of one end of the case 8, and includes a central opening 10b. A projection 8d extending towards the upper portion 8b is formed in the lower portion 8a. The projection 8d is fitted into the opening 10b of the valve body 10a to position the valve body 10a. Further, the valve body 10a is held between a distal end of a column portion 8e extending from the upper portion 8b towards the lower portion 8a and an upper surface 8f of the lower portion 8a, so as to prevent separation of the valve body 10a from the projection 8d. An annular projection 8g is formed on the upper surface 8f of the lower portion 8a so as to extend around the through-holes 8c. The valve body 10a has elasticity and its peripheral portion is resiliently pressed against the annular projection 8g. Thus, a space between the peripheral portion of the valve body 10a and the annular projection 8g is sealed, to thereby prevent a flow of air from the passage 16 to the through-holes 8c. The peripheral portion of the valve body 10a is separated from the projection 8g by a flow of outside air into the case 8, that is, a flow of air from the constant-pressure chamber 3 in which the ejector 4 is provided towards the passage 16. The check valve 10 allows only this flow of air.

The check valve 11 is provided at the other end of the case 8. It is connected to the suction ports 14 of the ejector body 9 through the passage 17 formed in the case 8. The check valve 11 comprises a plurality of through-holes 8h formed at the bottom of the lower portion 8a and a valve body 11a capable of sealing the through-holes 8h. An arrangement of the check valve 11 is substantially the same as that of the check valve 10, and therefore detailed explanation thereof is omitted. The check valve 11 allows only a flow of outside air into the case 8, that is, an air flow from the constant-pressure chamber 3 in which the ejector 4 is provided towards the passage 17.

In the case 8, the passage 16 extends from an outlet of the nozzle 12 of the ejector body 9 to the check valve 10. Also in the case 8, the passage 17 extends from the suction ports 14 to the check valve 11. Further, in the case 8, there is provided a passage 18 which allows communication between the nozzle 12 and a connecting pipe 20 described later. A connecting pipe 19 (an outlet pipe) communicated with the passage 16 and the connecting pipe 20 (an inlet pipe) communicated with the passage 18 uprightly extend from the case 8. The case 8 is provided within the constant-pressure chamber 3 of the pneumatic booster 1 along an outer circumferential surface of the mounting recess 6 at the bottom portion 2a of the outer shell 2. The connecting pipes 19 and 20 extend through the bottom portion 2a of the outer shell 2 to the outside of the pneumatic booster 1. Seal bushes 21 and 22 are provided so as to seal spaces between the outer shell 2, and the connecting pipes 19 and 20.

The pneumatic booster 1 is provided between a brake pedal of a vehicle and a master cylinder. The connecting pipe 19 is connected to the downstream side of an engine suction pipe (a source of a negative pressure). The connecting pipe 20 is connected to an air cleaner or a downstream-side portion of a supercharger, such as a turbocharger, on the upstream side of the engine suction pipe.

An operation of this embodiment will now be described below.

When the degree of vacuum of the suction pipe of the engine is higher than that of the constant-pressure chamber 3 of the pneumatic booster 1, for example, immediately after start-up of the engine, the check valve 10 opens due to the suction pressure of the engine introduced to the passage 16 through the connecting pipe 19. Thus, the suction pressure of the engine is directly supplied to the constant-pressure chamber 3.

When the degree of vacuum of the constant-pressure chamber 3 reaches the degree of vacuum of the engine suction pipe, the check valve 10 closes. At the same time, a flow of air from the nozzle 12 to the diffuser 13 is generated in the ejector body 9, due to a difference between the suction pressure of the engine introduced to the passage 16 through the connecting pipe 19 and the atmospheric pressure in the air cleaner or an air pressure (a positive pressure) in the downstream-side portion of the turbocharger introduced to the passage 18 through the connecting pipe 20. When the flow velocity of air at the throat portion 15 of the nozzle 12 reaches the sonic velocity due to the effect of the Laval nozzle, a vacuum higher than that in the engine suction pipe is generated at the suction ports 14. Due to this high degree of vacuum, the check valve 11 opens, to thereby supply a negative pressure to the constant-pressure chamber 3. Thus, even when a degree of vacuum in the engine suction pipe is low (about −200 mmHg), a high degree of vacuum (about −400 mmHg) can be generated by the ejector body 9, thus increasing the degree of vacuum in the constant-pressure chamber 3.

As has been described above, in the constant-pressure chamber 3 of the pneumatic booster 1, the ejector 4 is provided along the outer circumferential surface of the mounting recess 6 of the bottom portion 2a of the outer shell 2, and the check valves 10 and 11 are formed integrally with the ejector 4. With this arrangement, it is possible to effectively utilize a space within the constant-pressure chamber 3, and to eliminate the need to separately provide a space for mounting the ejector, thus achieving space-saving. As the pneumatic booster 1, a conventional pneumatic booster can be used. Therefore, a device for conveyance does not have to be changed. Further, because the suction ports 14 are open to the inside of the constant-pressure chamber 3 through the check valve 11, there is no need to provide a pipe for connecting the ejector 4 to the constant-pressure chamber 3 of the pneumatic booster 1. Therefore, an operation for mounting the ejector can be easily conducted, and a cost of piping and the mounting can be reduced. Further, the ejector includes the two connecting pipes 19 and 20 extending to the outside of the pneumatic booster 1. Therefore, piping for supplying a negative pressure, and atmospheric pressure or a positive pressure to the constant-pressure chamber 3 and the ejector 4 can be easily provided.

In this embodiment, the case 8 of the ejector 4 has a closed type structure, in which the connecting pipes 19 and 20 connected to the case 8 extend through the outer shell 2 to the outside of the pneumatic booster 1. However, the case 8 may have an open type structure. In this case, the case 8 is connected to the bottom portion 2a of the outer shell 2 so as to close an open end of the case 8, and the connecting pipes 19 and 20 are connected to the bottom portion 2a of the outer shell 2.

Figure 7:
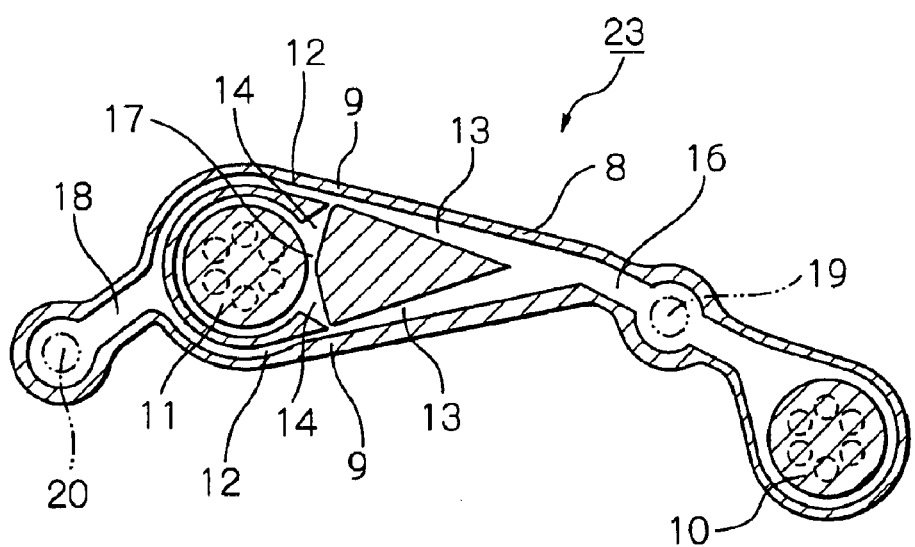
FIG. 7 is a transverse cross-sectional view of a modified example of an ejector mounted on the pneumatic booster shown in FIG. 1.

Next, referring to FIG. 7, explanation is made with regard to a modified example of an ejector attached to the pneumatic booster 1. In FIG. 7, the portions which are the same as those of the ejector shown in FIGS. 3 through 6 are designated by the same reference numerals as used in FIGS. 3 through 6. Only the portions different from those in FIGS. 3 through 6 are described in detail.

FIG. 7 shows an ejector 23 in this modified example. The ejector 23 comprises two ejector bodies 9, which are arranged in parallel in the case 8 in a curved form. A single suction port 14 is provided in each of the two ejector bodies 9, and the check valve 11 connected to these suction ports 14 is provided adjacent to the ejector bodies 9. In the ejector 23, the connecting pipes 19 and 20 are formed at the same positions as in the ejector 4 shown in FIGS. 3 through 6 so that the ejector 23 can be directly attached to the pneumatic booster 1.

By arranging the two ejector bodies 9 in parallel, a sufficiently large volume of suction air can be obtained. Therefore, even when the degree of vacuum in the engine suction pipe is low, the degree of vacuum in the constant-pressure chamber can be rapidly recovered, thus increasing responsiveness of the pneumatic booster 1. Although the two ejector bodies 9 are arranged in parallel in this example, the number of ejector bodies may be arranged in three or more.

As has been described in detail above, in the above-mentioned embodiment, the ejector is provided within the pneumatic booster. Therefore, a space within the constant-pressure chamber can be effectively utilized, thus achieving space-saving. Further, because the suction ports are open to the inside of the constant-pressure chamber, it is unnecessary to provide a pipe for connecting the ejector to the constant-pressure chamber. This results in an easy mounting operation and a reduction in the cost of piping. In addition, by means of the inlet pipe and the outlet pipe extending to the outside of the pneumatic booster, piping of the ejector can be easily conducted. Further, because the ejector is accommodated within the pneumatic booster, the ejector is not subject to any external force, thus reducing the possibility of breakage of the ejector during transportation or after mounting on a vehicle.

By providing the first and second check valves in the ejector, the desired amounts of a negative pressure, and atmospheric pressure or a positive pressure can be supplied to the constant-pressure chamber and the ejector through the inlet and outlet pipes. Further, piping for supplying pressures can be easily provided.

The ejector may be bent in a circumferential direction of the shell and be provided along an outer circumferential surface of the mounting recess at the bottom portion of the shell. In this case, a space within the constant-pressure chamber can be effectively utilized.

The ejector may comprise a plurality of ejector bodies arranged in parallel. In this case, a sufficiently large volume of suction air can be obtained, thus increasing responsiveness of the pneumatic booster.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Application No. 2002-286291 filed on Sep. 30, 2002 including specification, claims, drawings and summary is incorporated herein by reference in its entirety.

What is claimed is:

1. A pneumatic booster comprising:
    a shell;
    a power piston dividing the inside of the shell into a constant-pressure chamber and a variable-pressure chamber, with a negative pressure being supplied to the constant-pressure chamber, wherein a pressure in the variable-pressure chamber is adjusted, to thereby generate a thrust force in the power piston under a differential pressure generated between the constant-pressure chamber and the variable-pressure chamber; and an ejector provided within the constant-pressure chamber, said ejector comprising:

an inlet pipe communicated with an air inlet on a side of a nozzle of the ejector; and an outlet pipe communicated with an air outlet on a side of a diffuser of the ejector, said inlet pipe and said outlet pipe extending to the outside of the shell, a suction port of the ejector being open to the inside of the constant-pressure chamber.

2. A pneumatic booster according to claim 1, wherein the ejector further comprises a first check valve which allows only a flow of air from the constant-pressure chamber towards the suction port and a second check valve which enables communication between the outlet pipe and the constant-pressure chamber and allows only a flow of air from the constant-pressure chamber towards the outlet pipe.

3. A pneumatic booster according to claim 1, wherein the shell is generally in the form of a bottomed cylinder, and a mounting recess for mounting of a master cylinder is formed at a bottom portion of the shell, said ejector being bent in a circumferential direction of the shell and being provided along an outer circumferential surface of the mounting recess at the bottom portion of the shell.

4. A pneumatic booster according to claim 1, wherein the ejector comprises a plurality of ejector bodies arranged in parallel.

5. A pneumatic booster according to claim 2, wherein the shell is generally in the form of a bottomed cylinder, and a mounting recess for mounting of a master cylinder is formed at a bottom portion of the shell, said ejector being bent in a circumferential direction of the shell and being provided along an outer circumferential surface of the mounting recess at the bottom portion of the shell.

6. A pneumatic booster according to claim 2, wherein the ejector comprises a plurality of ejector bodies arranged in parallel.

7. A pneumatic booster according to claim 3, wherein the ejector comprises a plurality of ejector bodies arranged in parallel.

* * * * *